No. 673,311. Patented Apr. 30, 1901.
G. BARTLETT.
ADJUSTABLE SAW CLAMP.
(Application filed Aug. 29, 1900.)
(No Model.)
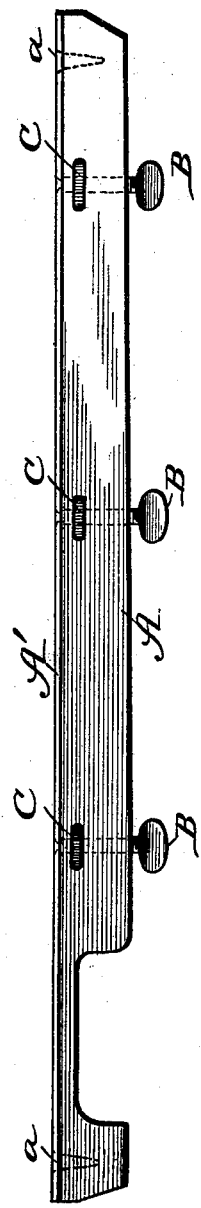
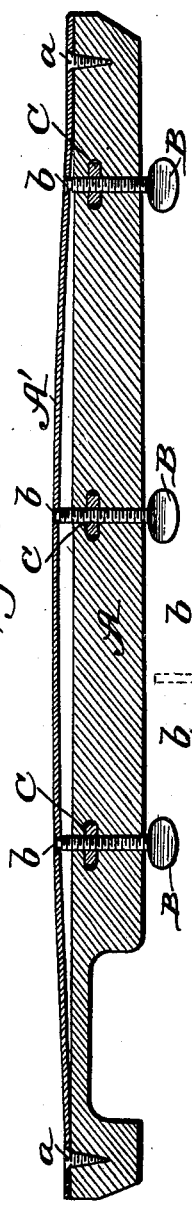
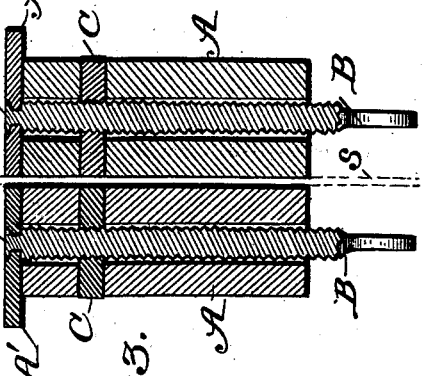
WITNESSES:
Jos. A. Ryan
Edw. W. Byrn.
INVENTOR
Granville Bartlett.
BY Munn & Co.
ATTORNEYS

UNITED STATES PATENT OFFICE.

GRANVILLE BARTLETT, OF LEXINGTON, KENTUCKY.

ADJUSTABLE SAW-CLAMP.

SPECIFICATION forming part of Letters Patent No. 673,311, dated April 30, 1901.

Application filed August 29, 1900. Serial No. 28,457. (No model.)

*To all whom it may concern:*

Be it known that I, GRANVILLE BARTLETT, of Lexington, in the county of Fayette and State of Kentucky, have invented a new and useful Improvement in Adjustable Saw-Clamps, of which the following is a specification.

My invention is in the nature of an improved adjustable saw-clamp designed to be used in connection with a saw-filing apparatus—such, for instance, as is shown and described in the application for Letters Patent filed by me July 26, 1900, Serial No. 24,944.

The object of my present improvement is to render the upper portion of the clamp adjustable to either a curved or straight line to permit the filing or jointing of saws to a straight or curved line of teeth, as may be desired; and it consists in the construction and arrangement of the parts of the device, which I will now proceed to describe with reference to the drawings, in which—

Figure 1 is a side view of one section of the clamp adapted for a straight row of teeth. Fig. 2 is a vertical longitudinal section through the same, showing the upper clamping edge adjusted to a curved line; and Fig. 3 is an enlarged cross-section of the two sections of the clamp, showing the means of adjustment.

The clamp is made in two sections A A exactly alike, and preferably made of wood, and arranged to be clamped together upon the saw which is placed between them, as indicated by the dotted lines S in Fig. 3, all substantially as shown and described in my previous application referred to.

Along the upper faces of the wooden clamp-bars A are secured two corresponding metal spring-plates A' A', which run the entire length of the clamps and are secured at the ends rigidly to the wood or main body sections by means of screws *a* or by bolts or any other suitable means.

At suitable intervals along the clamps there are arranged adjusting-screws B, occupying a vertical position, with their thumb-pieces at the bottom and below the clamps and with their upper ends passing through and swiveling in the plates A'. Embedded in the body portion of each clamp-section are corresponding nuts C, fixed in stationary relation, and whose threads mesh with the threads of their respective screws B. The openings through the body portion A of the clamp are large enough to give free passage for the threads of the screws without engaging with the said body portion, and the ends of the screws above the body portion are reduced in size and pass through relatively small holes in the metal plate and are then upset or enlarged at the upper ends, so as to form a swiveling head. This connects each screw to the plate A' by a shoulder on the lower side of the plate and a head or enlargement on the upper side, which cause the plate A' to move with the screw in its adjustment through its nut C. By this means it will be seen that the plates A' may be held to a straight line, as in Fig. 1, when filing a straight row of teeth, or may be projected upward by turning up the screws B a regulated distance, which throws the plate A' to any desired curve for filing or jointing a curved row of saw-teeth in a very simple, practical, and convenient manner.

Any form of swiveling connection between the screws B and plates A' may be employed, and the body portion A of the clamp may be made of wood or metal, as may be desired.

I do not confine myself, furthermore, to the set-screws for springing up the plate, but may use any other equivalent device for this purpose.

Having thus described my invention, what I claim as new, and desire to secure by Letters Patent, is—

1. A clamp for holding saws having each of its sections formed with an adjustable face-plate with means for adjusting it from a straight to a curved line substantially as described.

2. A clamp for holding saws made in sections, comprising a wooden body portion, a metal face-plate arranged on top of the same and secured rigidly to it at the ends, and intermediate means for projecting the metal face-plate to a curved line substantially as described.

3. A clamp for holding saws made in sections, comprising a body portion, a metal face-plate rigidly attached thereto at its ends, and adjusting-screws arranged in the body portion and passing through it to contact with the face-plate, for springing it up substantially as described.

4. A clamp for holding saws made in sections, comprising a body portion having nuts embedded in it, a metal face-plate rigidly attached at its ends to the said body portion, and set-screws tapped through the nuts in the body portion and having a swiveling connection with the face-plate substantially as and for the purpose described.

GRANVILLE BARTLETT.

Witnesses:
BENJAMIN MIDDLEDITCH,
REINDER DE VRIES.